(12) United States Patent
Deal et al.

(10) Patent No.: US 7,681,891 B2
(45) Date of Patent: Mar. 23, 2010

(54) SHOPPING CART ADAPTED TO RECEIVE ELONGATED ITEMS

(75) Inventors: Alan Deal, Claremont, NC (US); Thomas Collins, Newton, NC (US); Joe Whisnant, Newton, NC (US)

(73) Assignee: Technibilt, Ltd., Newton, NC (US)

( * ) Notice: Subject to any disclaimer, the term of this patent is extended or adjusted under 35 U.S.C. 154(b) by 182 days.

(21) Appl. No.: 12/004,254

(22) Filed: Dec. 19, 2007

(65) Prior Publication Data

US 2009/0160145 A1  Jun. 25, 2009

(51) Int. Cl.
*B62D 39/00* (2006.01)
(52) U.S. Cl. .............................. 280/33.991; 280/33.997
(58) Field of Classification Search ............ 280/33.991, 280/33.992, 33.995, 651, 47.35, 33.997, 280/33.996
See application file for complete search history.

(56) References Cited

U.S. PATENT DOCUMENTS

| | | | | | |
|---|---|---|---|---|---|
| 2,479,530 | A | * | 8/1949 | Watson | 280/33.991 |
| 2,943,707 | A | * | 7/1960 | Ramlose | 280/33.995 |
| 3,039,564 | A | * | 6/1962 | Shaukis | 280/33.995 |
| 5,435,582 | A | * | 7/1995 | Davidson | 280/33.992 |
| 5,507,507 | A | * | 4/1996 | Davidson | 280/33.991 |
| 5,553,876 | A | * | 9/1996 | Trubiano | 280/33.991 |
| D379,706 | S | | 6/1997 | Hurst | |
| 5,836,422 | A | * | 11/1998 | Hurst | 280/33.991 |
| 6,641,147 | B2 | * | 11/2003 | Werner | 280/33.991 |
| 6,644,674 | B2 | * | 11/2003 | Simard | 280/33.991 |
| 6,889,998 | B2 | * | 5/2005 | Sterns et al. | 280/651 |
| 6,932,363 | B2 | * | 8/2005 | D'Angelo | 280/33.991 |
| 7,300,062 | B2 | * | 11/2007 | Otterlee et al. | 280/33.992 |

OTHER PUBLICATIONS

2 Tier Carts, New cart design for any market!; Technibilt, Ltd. Product Catalogue; p. 12; Newton, North Carolina.
Specialty Carts, Unique sizes and features for today's market requirements; Technibilt, Ltd. Product Catalogue, p. 13; Newton, North Carolina.

* cited by examiner

*Primary Examiner*—Hau V Phan
(74) *Attorney, Agent, or Firm*—Carter, Schnedler & Warnock, P.A.

(57) ABSTRACT

There is provided a shopping cart adapted to receive elongated items. The shopping cart includes a frame having an upper portion and a lower portion. A plurality of wheels are connected to the lower portion of the frame. The shopping cart includes an upper basket attached to the upper portion of the frame and a lower basket attached to the lower portion of the frame. The upper basket and lower basket are each open at the top and each is formed from a plurality of vertical and horizontal wire segments which form a plurality of windows. The upper basket has a front wall with a slot therein. The slot has a top portion and a bottom portion with the top portion being open so as to receive and retain an elongated item. The bottom portion of the slot extends down at least a portion of the front wall. The lower basket has a back wall with at least one major open for receiving an elongated item.

25 Claims, 5 Drawing Sheets

SHOPPING CART ADAPTED TO RECEIVE ELONGATED ITEMS

FIELD OF THE INVENTION

This invention relates to shopping carts. More particularly, it relates to shopping carts which are adapted to receive elongated items.

BACKGROUND OF THE INVENTION

Shopping carts have been provided with both upper and lower baskets attached to the frame to carry items which are purchased at a store. With the advent of large warehouse-type shopping stores, it is now common to purchase large items, including elongated items such as pipe, lumber, fence posts, landscape timbers and trees. However, conventional shopping carts are not designed to carry elongated items. For this reason, some of the warehouse-type shopping stores provide dollies which are merely rectangular pallets supported on wheels, having large "U" shaped vertical handlebars in the rear thereof. A disadvantage of these pallets is that they are very large and can not be nested and occupy a large space in the aisles and, consequently, are usually stored outside the store. This can cause several secondary problems such as the pallets being stranded in the parking areas, causing damage to automobiles. The pallets can also be stolen and can also cause injury to persons' legs and ankles. A disadvantage of using a conventional shopping cart in these warehouse-type stores is that elongated items are often placed in the basket and protrude outwardly thereof from the sides, which may interfere with the normal operation of the cart.

SUMMARY OF THE INVENTION

In accordance with one form of this invention there is provided a shopping cart adapted to receive elongated items. The shopping cart includes a frame having an upper portion and a lower portion. A plurality of wheels are connected to the lower portion of the frame. The shopping cart includes an upper basket attached to the upper portion of the frame. The upper basket is open at the top. The upper basket has a front wall. A slot is formed in the front wall of the upper basket. The slot has a top portion and a bottom portion. The top portion of the slot is open to receive a portion of an elongated item. The bottom portion of the slot extends down at least a portion of the front wall. A lower basket is attached to the lower portion of the frame. The lower basket is open at the top. The lower basket has a front wall. The front wall of the lower basket extends beyond the front wall of the upper basket. Preferably one end of the elongated item rests against the floor of the lower basket with the other end of the elongated item extending above the upper basket wherein the slot in the upper basket retains a portion of the elongated item.

In accordance with another form of this invention there is provided a shopping cart adapted to receive elongated items. The shopping cart includes a frame having an upper portion and a lower portion. A plurality of wheels are connected to the lower portion of the frame. The shopping cart includes an upper basket attached to the upper portion of the frame. The upper basket is open at the top. The vertical and horizontal wire segments form a plurality of windows. The upper basket has a front wall. A slot is formed in the front wall of the upper basket. The slot has a top portion and a bottom portion. The top portion of the slot is open to receive an elongated item. The bottom portion of the slot extends down at least a portion of the front wall. The width of the slot is less than one-half of the width of the front wall.

In accordance with yet another form of this invention, there is provided a shopping cart adapted to receive elongated items. The shopping cart includes a frame having an upper portion and a lower portion. A plurality of wheels are connected to the lower portion of the frame. The shopping cart includes a lower basket. The lower basket is attached to the lower portion of the frame. The lower basket is open at the top and is formed from a plurality of vertical and horizontal wire segments. The vertical and horizontal wire segments form a plurality of windows. The lower basket has a back wall. The back wall has at least one major opening for receiving an elongated item. At least one of the windows being adjacent to the major opening. The area of the major opening being substantially greater than the area of the adjacent window.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 1:
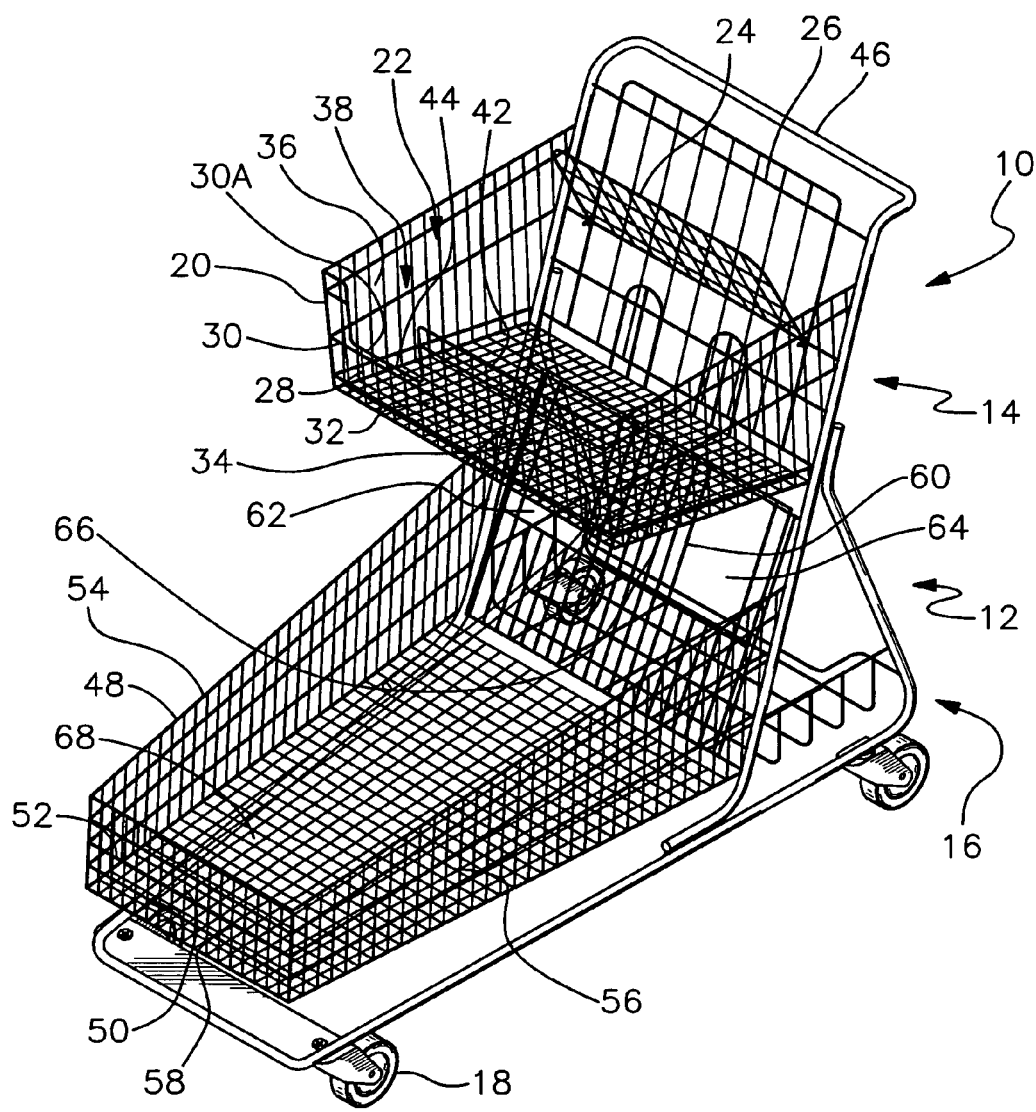
FIG. 1 is a pictorial view of a shopping cart of the subject invention.

Referring now more particularly to FIGS. 1-5, there is provided shopping cart 10 having frame 12. Frame 12 includes upper portion 14 and lower portion 16. Four wheels 18, which may be castors, are connected to lower portion 16 of frame 12. Upper basket 20 is attached to upper portion 14 of frame 12, preferably by welding the upper basket to the frame.

Figure 2:
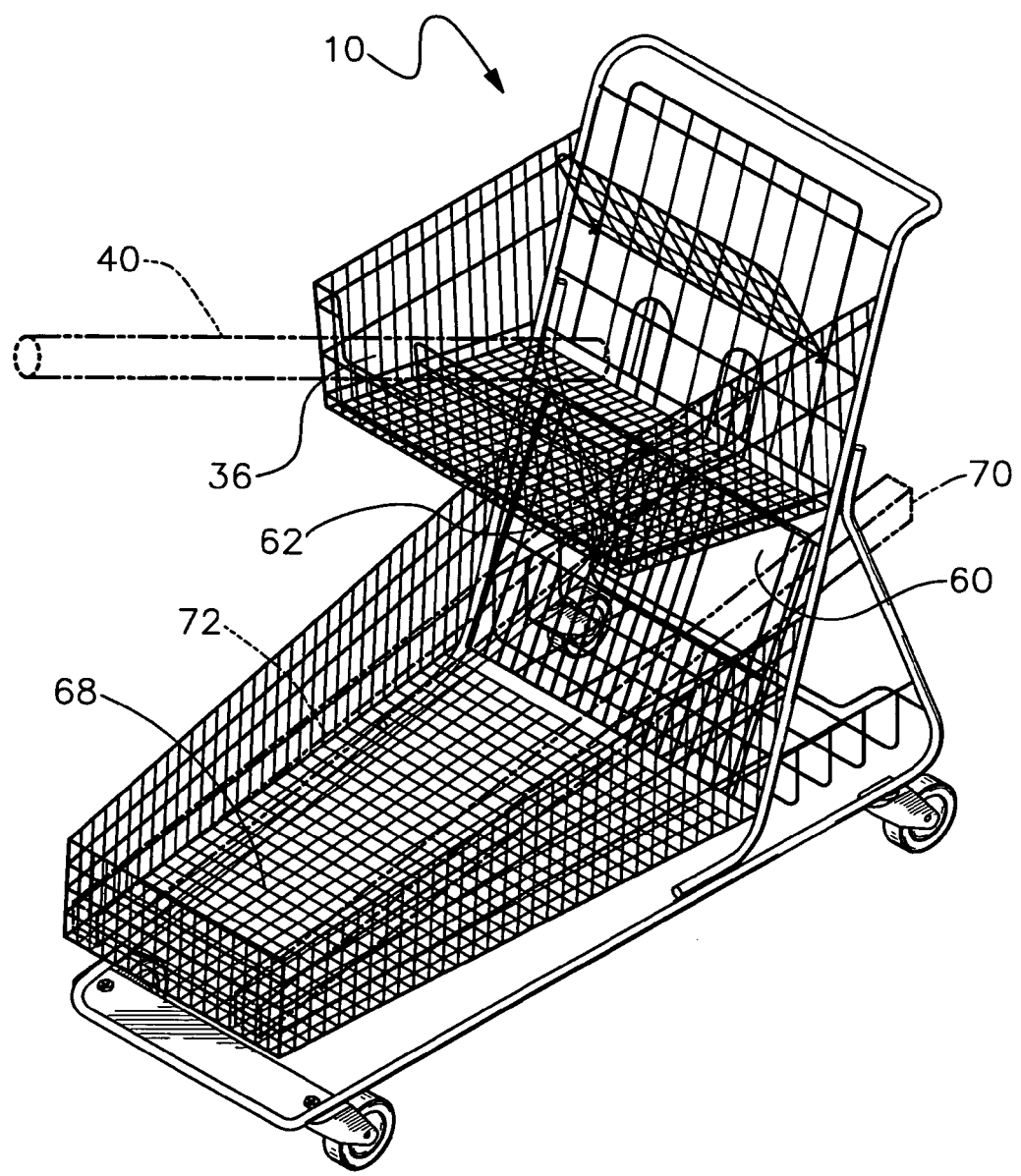
FIG. 2 is a pictorial view of the shopping cart of FIG. 1 with elongated items received in the shopping cart.
Figure 3:
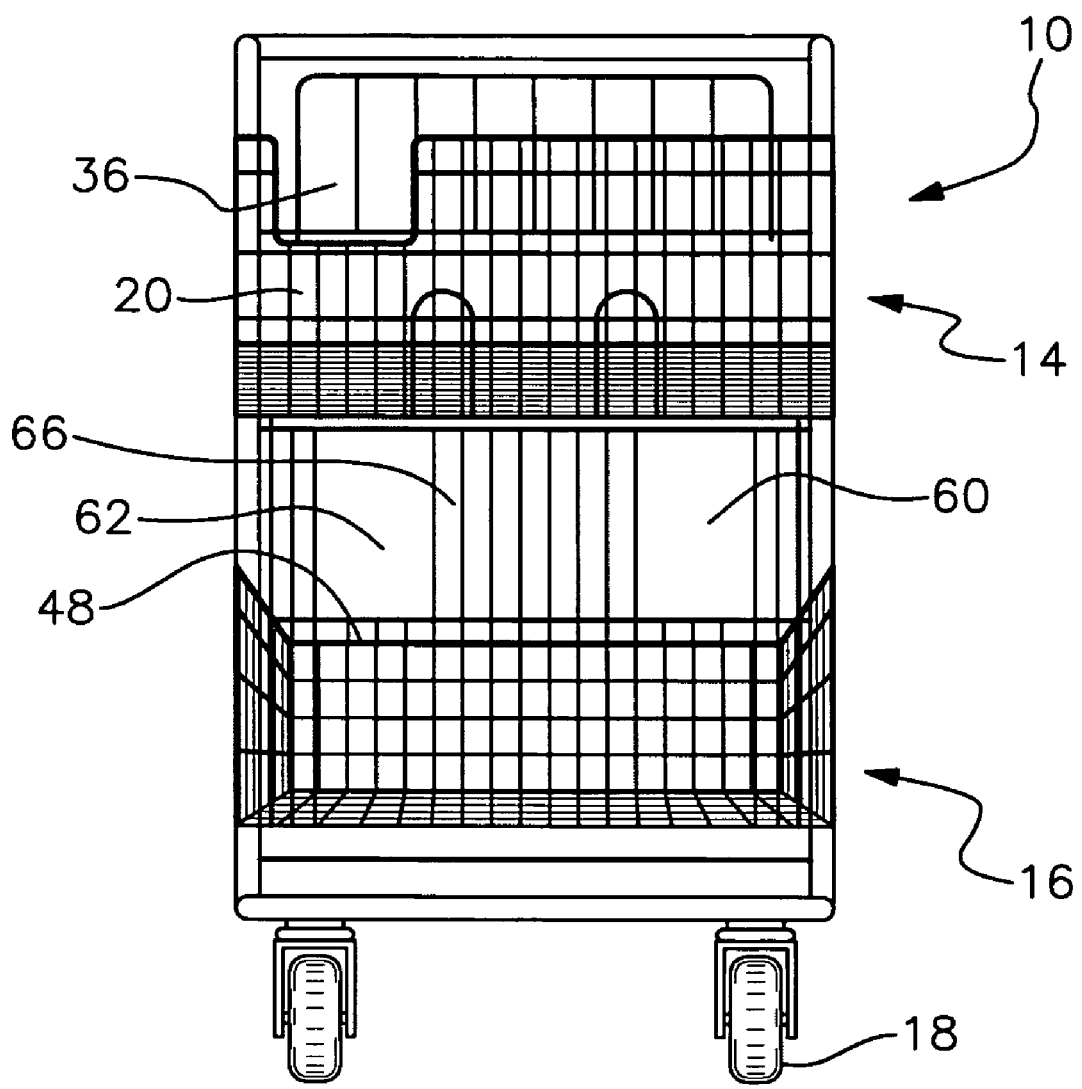
FIG. 3 is a front elevational view of the shopping cart of FIG. 1.
Figure 4:
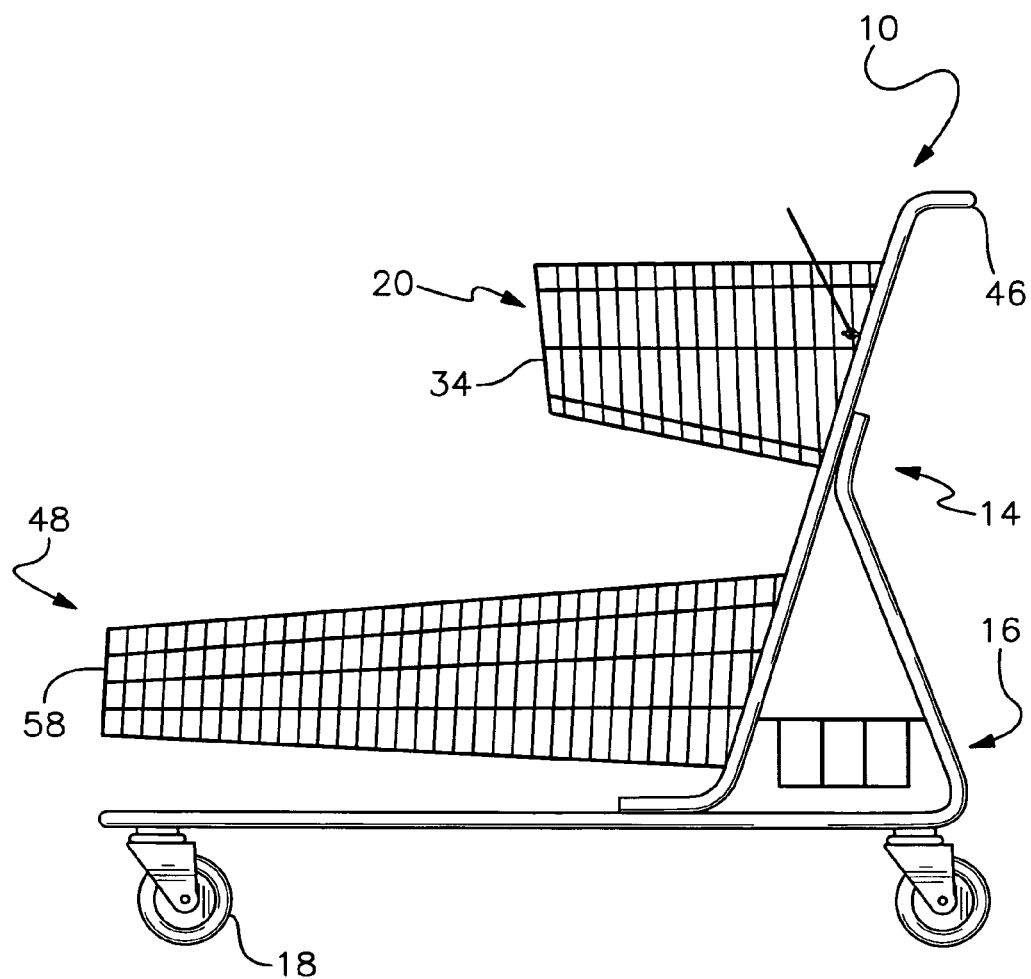
FIG. 4 is a side elevational view of the shopping cart of FIG. 1.
Figure 5:
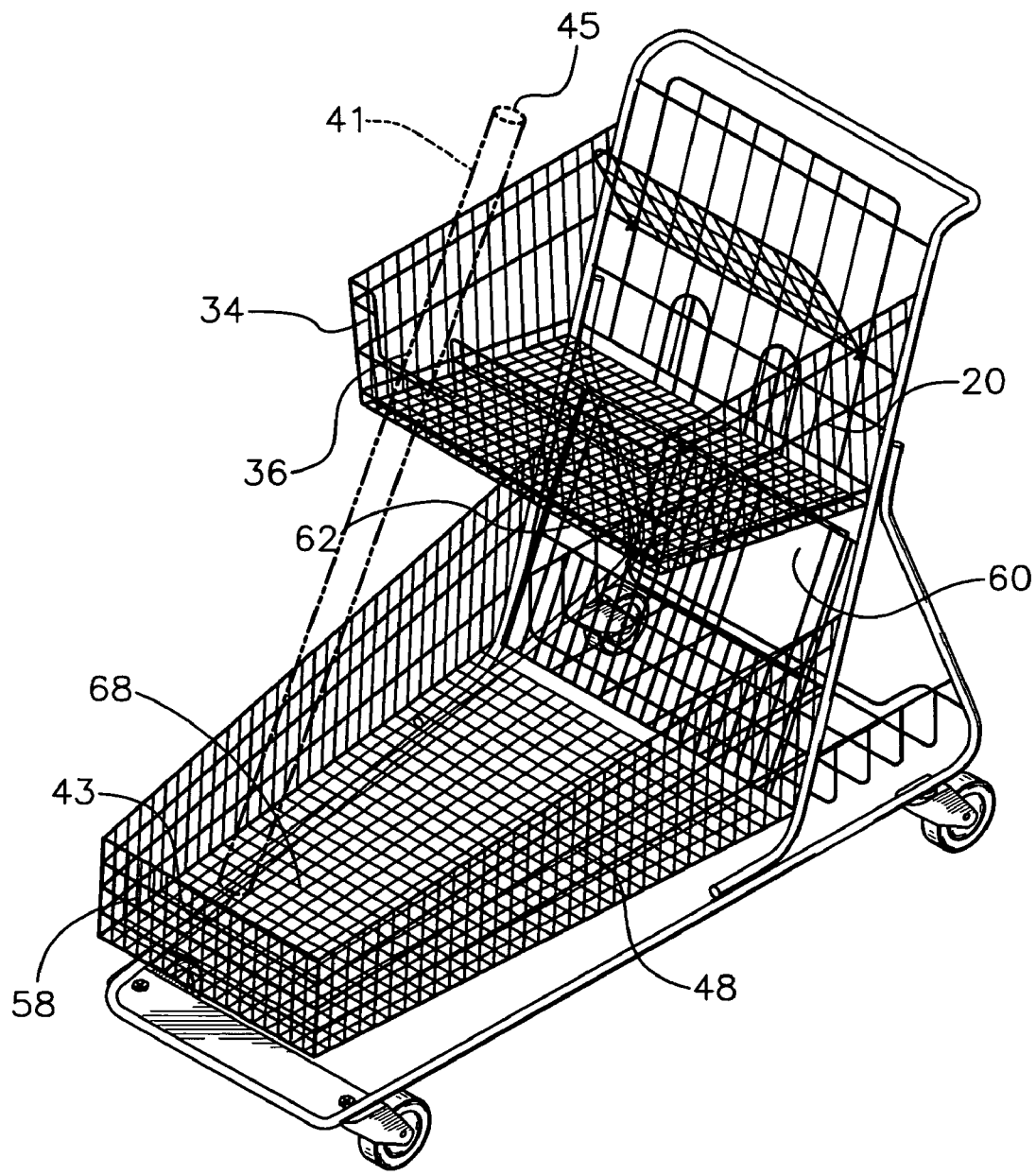
FIG. 5 is a pictorial view of the shopping cart of FIG. 1 with an elongated item received in the shopping cart.

The top 22 of upper basket 20 is open for receiving items such as consumer goods. Collapsible baby seat 24 is attached to back wall 26 of upper basket 20. Upper basket 20 is preferably formed from a plurality of vertical and horizontal wire segments 28 and 30. Back wall 26 is hinged at the top to a horizontal wire segment, thus forming a gate, so that the carts may be nested. The vertical and horizontal wire segments form a plurality of windows 32. Front wall 34 of upper basket 20 includes slot 36 formed therein. Slot 36 is preferably somewhat "U" shaped. One of the windows is adjacent to said slot 36. The area of the slot is substantially greater than the area of its adjacent windows. The top 38 of slot 36 is open and the slot is adapted to receive and retain an elongated item, such as elongated item 40 shown in FIG. 2 or elongated item 41 shown in FIG. 5. The elongated items shown in FIGS. 2 and 5 are hollow plastic pipes. However, it could be most any elongated item which does not conveniently fit in a prior art shopping cart basket. In the embodiment of FIG. 2, one end of elongated item 40 extends out of the upper basket 20 and the other end of elongated item 40 rests on the floor of upper basket 40. In the embodiment of FIG. 5, one end 43 of elongated item 41 rests against the floor 60 of lower basket 48 and the other end 45 extends above upper basket 20, while of portion of item 41 is received in and retained by slot 36 in basket 20. The embodiment of FIG. 5 shows how shopping cart 10 may be used to carry very long items without interfering with the normal operation of the shopping cart.

The top edge 42 of wall 34 of upper basket 20 is formed by one of the horizontal wire segments 30A. Wire segment 30A also forms a border for the slot 36 including bottom 44 of slot 36. Preferably, the bottom of 44 slot 36 only extends partway down the wall 34 and is above the floor of upper basket 20. The width of slot 36 is preferably small enough so that most normal elongated items, such as a hollow plastic pipe or piece of lumber, will not move side to side very much while the shopping cart is in use. Preferably, the width of slot 36 is less than half of the width of wall 34. The shopping cart also includes handle 46 which is used by the consumer to push the cart and preferably is part of upper portion 14 of frame 12.

Shopping cart 10 also includes lower basket 48 which is attached to lower portion 16 of frame 12, preferably by welding. Lower basket 48 is also constructed by a plurality of vertical and horizontal wire segments illustrated as 50 and 52. Lower basket 48 includes side walls 54 and 56 and front wall 58 and rear wall 60. The front wall 58 of lower basket 48 extends beyond the front wall 34 of upper basket 20. This extension of the front wall of the lower basket enables the shopping cart to readily carry elongated item 41 shown in FIG. 5 since the elongated item is able to contact the floor 68 of the lower basket and lean against the upper basket through slot 36. In addition, this construction enables the customer to more easily place heavy loads, e.g., 5 gallon buckets, into the shopping cart by using the open lower basket 48.

The top of the rear wall 60 of lower basket 48 is hinged to a horizontal wire segment. The remaining portion of the rear wall not being attached to the shopping cart so that the rear wall forms a gate. Thus, the shopping cart may be readily nested by pushing the front wall 52 of one cart into the rear wall 60 of another cart. Floor 68 of lower basket 48 slopes upwardly from rear wall 60 to front wall 58 so as to enhance the shopping cart's ability to be nested with another shopping cart.

Rear wall 60 includes major openings 62 and 64. At least one window, such as window 66 formed by horizontal and vertical wire segments, is adjacent to each major opening 62 and 64. Each major opening 62 and 64 has an area which is substantially greater than the area of its adjacent window 66.

Major opening 62 and 64 are adapted to receive elongated items such as lumber 70 and 72 shown in FIG. 2. One of the ends of the elongated items 70 and 72 would normally rest against floor 68 of lower basket 48 and the other ends extend out of the rear wall 60 of lower basket 48.

The width of the front wall 58 of the lower basket 48 is less than the width of the rear wall 60 of the lower basket 48. Thus, the left and right side walls 54 and 56 of the lower basket 48 taper inwardly from the rear wall 60 to the front wall 58. The upward sloping of the floor 68 and the tapering of the sidewalls 54 and 56 also helps the shopping carts to readily nest.

From the foregoing description of the preferred embodiment of the invention, it is apparent that many modifications may be made therein. It should be understood however, that this embodiment of the invention is an exemplification of the invention only and that the invention is not limited thereto. It is to be understood therefore that it is intended in the appended claims to cover all modifications as fall within the true spirit and scope of the invention.

The invention claimed is:

1. A shopping cart adapted to receive elongated items comprising:
    a frame; said frame including an upper portion and a lower portion;
    a plurality of wheels connected to the lower portion of said frame;
    an upper basket; said upper basket attached to the upper portion of said frame; said upper basket being open at the top;
    said upper basket having a front wall;
    a slot in said front wall; said slot having a top portion and a bottom portion; the top portion of the slot being open so as to receive a portion of an elongated item; the bottom portion of the slot extending down at least a portion of the front wall; a width of the slot being less than one-half of a width of the front wall;
    a lower basket attached to the lower portion of said frame; said lower basket being open at the top and being formed from a plurality of vertical and horizontal wire segments forming a plurality of windows;
    said lower basket having a front face;
    said front face of said lower basket extending beyond the front face of said upper basket;
    said lower basket having a back wall;
    said back wall having at least one major opening for receiving an elongated item;
    at least one of said windows being adjacent to said major opening; and
    the area formed by the major opening being substantially greater than the area formed by the adjacent window.

2. A shopping cart as set forth in claim 1 wherein said upper basket has a floor; the bottom portion of said slot being above the floor of said upper basket.

3. A shopping cart as set forth in claim 1 wherein said upper basket being formed from a plurality of vertical and horizontal wire segments; said vertical and horizontal wire segments forming a plurality of windows; at least one of said windows is adjacent to said slot; the area formed by said slot substantially greater than the area formed by its adjacent window.

4. A shopping cart as set forth in claim 3 wherein a horizontal wire forms at least a portion of the upper edge of the front face of said upper basket and extends around said slot forming a border for said slot.

5. A shopping cart as set forth in claim 1 wherein said slot is substantially "U" shaped.

6. A shopping cart as set forth in claim 1 further including two major openings in said back wall.

7. A shopping cart as set forth in claim 1 wherein said lower basket has a floor; the portion of the floor of said lower basket adjacent to said front wall being higher than the portion of the floor of said lower basket adjacent to the rear wall wherein said floor is sloped upwardly from rear to front.

8. A shopping cart adapted to receive elongated items comprising:
    a frame; said frame including an upper portion and a lower portion;
    a plurality of wheels connected to the lower portion of said frame; and
    a lower basket; said lower basket attached to the lower portion of said frame; said lower basket being open at the top and having a plurality of vertical and horizontal wire segments; said vertical and horizontal wire segments forming a plurality of windows; said lower basket having a back wall; said back wall having at least one major opening for receiving an elongated item; at least one of said windows adjacent to said major opening; the area of said major opening being substantially greater than the area of its adjacent window.

9. A shopping cart as set forth in claim 8 wherein said lower basket has a floor; the portion of said floor of said lower basket adjacent to said front wall being higher than the portion of said floor of the lower basket adjacent to said rear wall, wherein said floor is sloped upwardly from rear to front.

10. A shopping cart as set forth in claim 8 further including an upper basket; said upper basket attached to said upper portion of said frame; said upper basket having a front wall; said lower basket having a front wall; said front of said lower basket extending beyond said front wall of said upper basket.

11. A shopping cart as set forth in claim 10 wherein said upper basket is formed from a plurality of vertical and horizontal wire segments; said vertical and horizontal wire segments forming a plurality of windows; a slot in said front wall of said upper basket; said slot having a top portion and a bottom portion; said top portion of said slot being open to readily receive an elongated item; said bottom portion of said slot extending down at least a portion of the front wall of said upper basket.

12. A shopping cart as set forth in claim 11 wherein said upper basket has a floor; the bottom portion of said slot being above said floor of said upper basket.

13. A shopping cart as set forth in claim 11 wherein at least one of said windows in said upper basket is adjacent to said slot; the area formed by said slot being substantially greater than the area formed by said window.

14. A shopping cart as set forth in claim 11 wherein said slot is substantially "U" shaped.

15. A shopping cart as set forth in claim 11 wherein a horizontal wire forms at least a portion of upper edge of said upper basket and extends around said slot forming a border for said slot.

16. A shopping cart adapted to receive elongated items comprising:
   a frame; said frame including an upper portion and a lower portion;
   a plurality of wheels connected to said lower portion of said frame;
   an upper basket; said upper basket attached to the upper portion of said frame;
   a lower basket; said lower basket attached to the lower portion of said frame; said upper basket and said lower basket each being open at the top and each formed from a plurality of vertical and horizontal wire segments; said vertical and horizontal wire segments forming a plurality of windows; said upper basket having a front wall;
   a slot in said front wall of said upper basket; said slot having a top portion and a bottom portion; the top portion of said slot being open so as to receive a portion of an elongated item; said bottom portion of said slot extending down at least a portion of the front wall; and
   said lower basket having a back wall; said back wall of said lower basket having at least one major opening for receiving an elongated item.

17. A shopping cart as set forth in claim 16 wherein lower basket has a front wall; the front wall of said lower basket extending beyond the front wall of said upper basket.

18. A shopping cart adapted to receive elongated items comprising:
   a frame; said frame including an upper portion and a lower portion;
   a plurality of wheels connected to the lower portion of said frame;
   an upper basket; said upper basket attached to the upper portion of said frame; said upper basket being open at the top;
   said upper basket having a front wall;
   a slot in said front wall; said slot having a top portion and a bottom portion; the top portion of the slot being open so as to receive a portion of an elongated item; the bottom portion of the slot extending down at least a portion of the front wall; a lower basket attached to the lower portion of said frame; said lower basket being open at the top; said lower basket having a front wall; said front wall of said lower basket extending beyond the front wall of said upper basket;
   said lower basket is formed from a plurality of vertical and horizontal wire segments forming a plurality of windows;
   said lower basket having a back wall;
   said back wall having at least one major opening for receiving an elongated item;
   at least one of said windows adjacent to said major opening; and
   the area formed by the major opening being substantially greater than the area formed by the adjacent window.

19. A shopping cart as set forth in claim 18 wherein said lower basket includes a floor; said floor of said lower basket adapted to receive one end of an elongated item with the other end of the elongated item extending above said upper basket.

20. A shopping cart as set forth in claim 18 wherein said upper basket has a floor, the bottom portion of said slot being above the floor of said upper basket.

21. A shopping cart as set forth in claim 18 wherein said upper basket is formed from a plurality of vertical and horizontal wire segments; said vertical and horizontal wire segments forming a plurality of windows; at least one of said windows is adjacent to said slot; the area formed by said slot is substantially greater than the area formed by its adjacent window.

22. A shopping cart as set forth in claim 18 wherein said slot is substantially "U" shaped.

23. A shopping cart as set forth in claim 22 wherein a horizontal wire forms at least a portion of the upper edge of the front face of said upper basket and extends around said slot forming a border for said slot.

24. A shopping cart as set forth in claim 18 further including two major openings in said back wall.

25. A shopping cart as set forth in claim 18 wherein said lower basket has a floor; the portion of the floor of the lower basket adjacent to said front wall being higher than the portion of the floor of said lower basket adjacent to the rear wall wherein said floor is sloped upwardly from rear to front.

* * * * *